(12) United States Patent
Chen et al.

(10) Patent No.: US 6,575,284 B2
(45) Date of Patent: Jun. 10, 2003

(54) CLUTCH OF A BEACH BUGGY

(75) Inventors: Tony Chen, Tainan Hsien (TW); Michael Yu, Tainan Hsien (TW)

(73) Assignee: Aeon Motor Co., Ltd. (TW)

( * ) Notice: Subject to any disclaimer, the term of this patent is extended or adjusted under 35 U.S.C. 154(b) by 0 days.

(21) Appl. No.: 09/987,290

(22) Filed: Nov. 14, 2001

(65) Prior Publication Data

US 2003/0089574 A1 May 15, 2003

(51) Int. Cl.[7] .............................................. F16D 43/18
(52) U.S. Cl. .............................. 192/105 CD; 192/52.1
(58) Field of Search .................... 192/105 CD, 55.1, 192/52.1, 52.4, 75, 65; 474/8

(56) References Cited

U.S. PATENT DOCUMENTS

| | | | | |
|---|---|---|---|---|
| 1,852,552 A | * | 4/1932 | Altorfer ............... | 192/105 CD |
| 2,443,593 A | * | 6/1948 | Birsch ................. | 192/105 CD |
| 3,000,480 A | * | 9/1961 | Bochory .............. | 192/105 CD |
| 3,610,062 A | * | 10/1971 | Hoff .................... | 192/105 CD |
| 4,294,342 A | * | 10/1981 | St. John ............... | 192/105 CD |
| 4,345,664 A | * | 8/1982 | Anno et al. .......... | 192/105 CD |
| 4,830,163 A | * | 5/1989 | Miyazaki et al. .... | 192/105 CD |
| 5,503,261 A | * | 4/1996 | Schultz ................ | 192/105 CD |

* cited by examiner

Primary Examiner—Rodney H. Bonck
(74) Attorney, Agent, or Firm—Bacon & Thomas, PLLC

(57) ABSTRACT

The clutch of a beach buggy. The clutch is provided with a friction enduring resilient annular member closely positioned between an actuating member and the outer cover of the clutch. Thus, when the engine of a beach buggy is started, the actuating member will be driven to rotate and the outer cover will be activated to rotate slowly by the pressing frictional force produced by the resilient annular member and the actuating member. At the same, a shift gear connected to the outer cover will also rotate slowly, improving the engagement between one of the transmission gears and the shifting gear before accelerating and accordingly preventing a beach buggy from rushing abruptly.

3 Claims, 10 Drawing Sheets

CLUTCH OF A BEACH BUGGY

BACKGROUND OF THE INVENTION

This invention relates to the clutch of a beach buggy, particularly to one capable to let the outer cover of the clutch activated to rotate slowly together with the transmission gear when the engine is started so that the shifting gear can easily mesh with the transmission gear. When gear shifting begins, probability and speed of engagement between these two gears are increased, preventing the beach buggy from abrupt rushing when accelerated.

A conventional beach buggy, as shown in FIG. 1, includes a transmission device having a drive disk 10 driven to rotate by the engine of a beach buggy and a clutch 20. The clutch 20 has a fixed groove wheel 21 and a sliding groove wheel 22 pushed to closely press the fixed groove wheel 21 by a spring 26, as shown in FIGS. 1 and 3, with a belt 23 fitted in between the two groove wheels 21, 22 and connected to the drive disk 10 so as to let the drive disk 10 rotate together with the clutch 20. Further, an actuating member 24 is positioned adjacent to the sliding groove wheel 22, capable to be rotated by a hollow shaft 210 protruding out from the fixed groove wheel 21, as shown in FIG. 2. The actuating member 24 has its circumferential edge provided with a plurality of curved members 240 arranged in a circle and one end of each curved member 240 is pivotally connected with the actuating member 24 and the other end is a free end, having a lining 241 secured on the outer wall of each curved member 240, so that the free ends of the curved members 240 are able to expand outward when the actuating member 24 rotates, as shown in FIGS. 2, 4 and 5.

Then, an outer cover 25 is positioned outside the actuating member 24 and the hollow shaft 210 of the fixed groove wheel 21, having an annular inward flange 250 covering around the actuating member 24, as shown in FIG. 4. Thus, when accelerated, the actuating member 24 rotates fast and the free ends of the curved members 240 will expand outward due to a centrifugal force, letting the linings 241 contact with the inward flange 250 of the outer cover 25 and the actuating member 24 rotate together with the outer cover 25, as shown in FIG. 5. In addition, the outer cover 25 is provided with a ratchet hole 251 in the center for receiving a drive shaft 252 so that the outer cover 25 can rotate together with the drive shaft 252, which also drives the transmission gear to rotate. Thus, when gear shifting begins one of the transmission gears meshes with the gear rotated by the drive shaft 252, and the beach buggy will begin to run forward or backward after being accelerated.

However, the conventional transmission device described above has the following defects.

1. When the engine of a beach buggy is started but not accelerated, the actuating rotator 24 of the clutch 20 cannot rotate fast and there isn't a centrifugal force large enough to push the curved members 240 to expand outward so that the outer cover 25 unable to contact with the linings 241 on the curved members 240 cannot be activated to rotate nor the transmission gear of the drive shaft 252. Thus, when carrying on gear shifting (whether the car is running forward or backward), one of the transmission gears keeps rotating but the gear driven by the drive shaft 252 remains still, failing to engage each other immediately and resulting in frictional creaking.

2. If accelerated at this time, the linings 241 on the free ends of the curved members 241 of the actuating member 24 will immediately contact with the inward flange 250 of the outer cover 25, as shown in FIG. 5, and the outer cover 25 of the clutch 20 will synchronously rotate fast together with the drive shaft 252 as well as the transmission gear. But, in case the transmission gear and the shifting gear immediately mesh with each other at this moment, the car will abruptly rush forward fast, endangering the driver himself and other persons.

SUMMARY OF THE INVENTION

This invention is devised to offer the clutch of a beach buggy, possible to let the shifting gear mesh with the transmission gear very fast and prevent the beach buggy from rushing forward abruptly.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
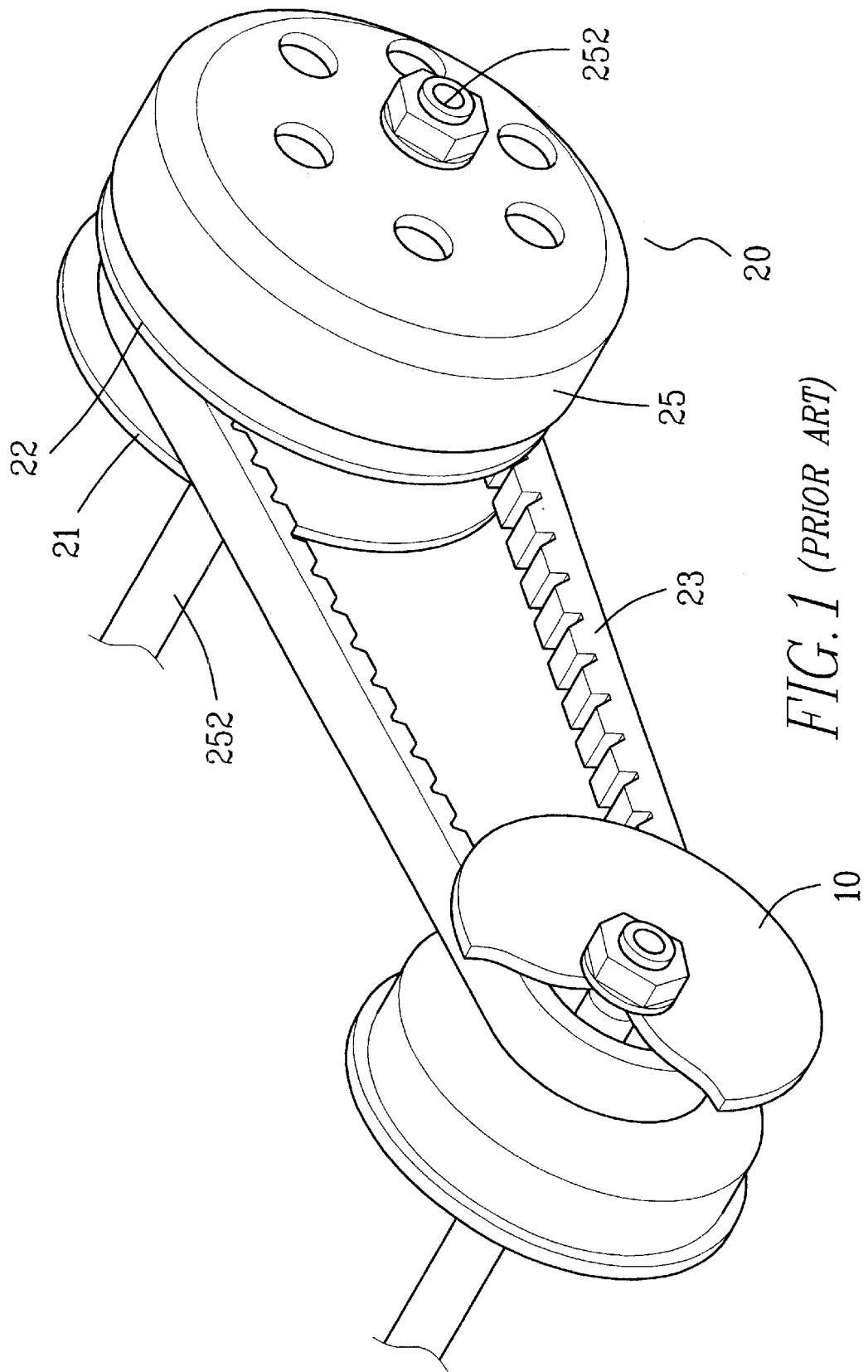
FIG. 1 is a perspective view of a clutch of a conventional beach buggy.
Figure 2:
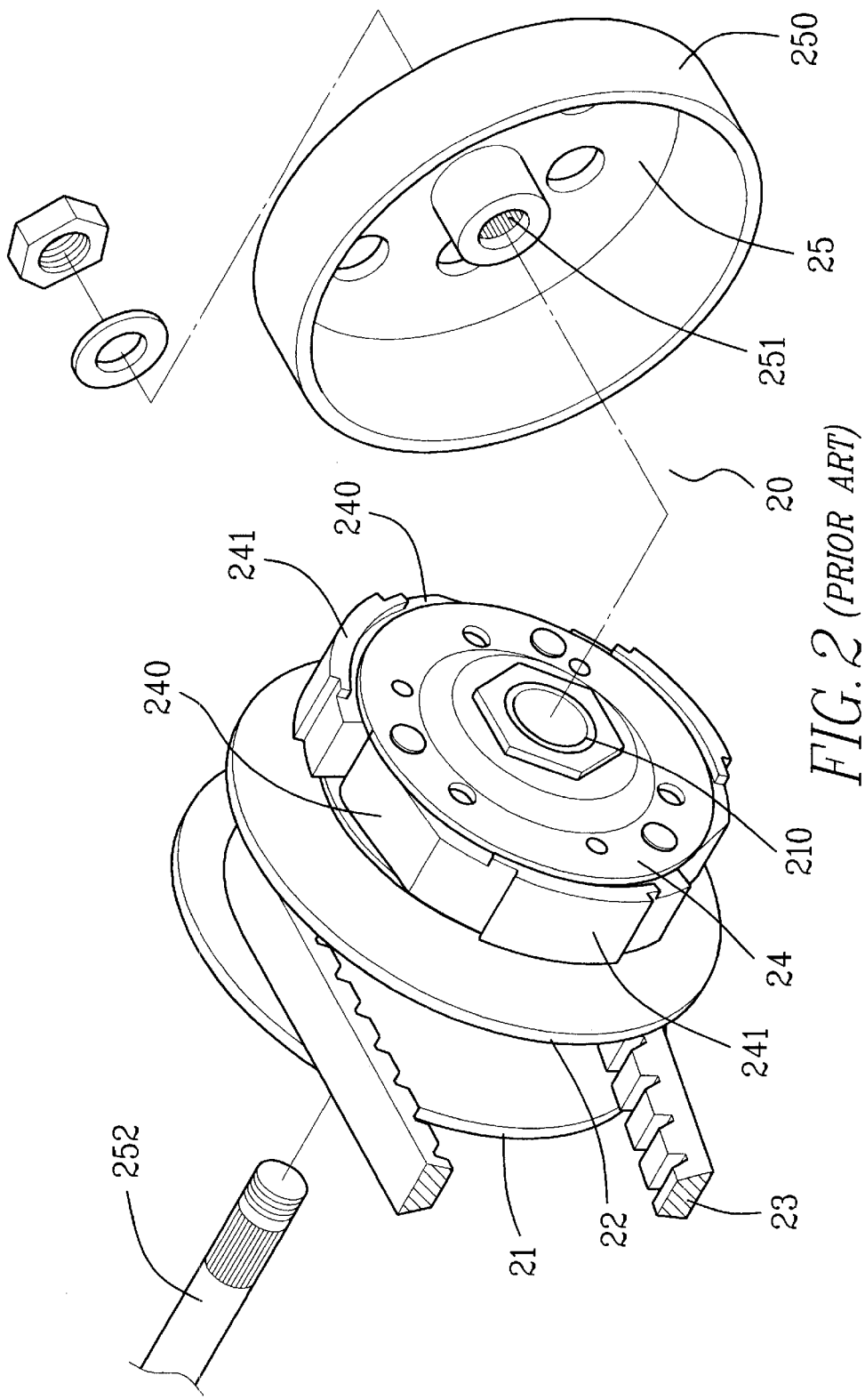
FIG. 2 is an exploded perspective view of the clutch of the convention beach buggy.
Figure 3:
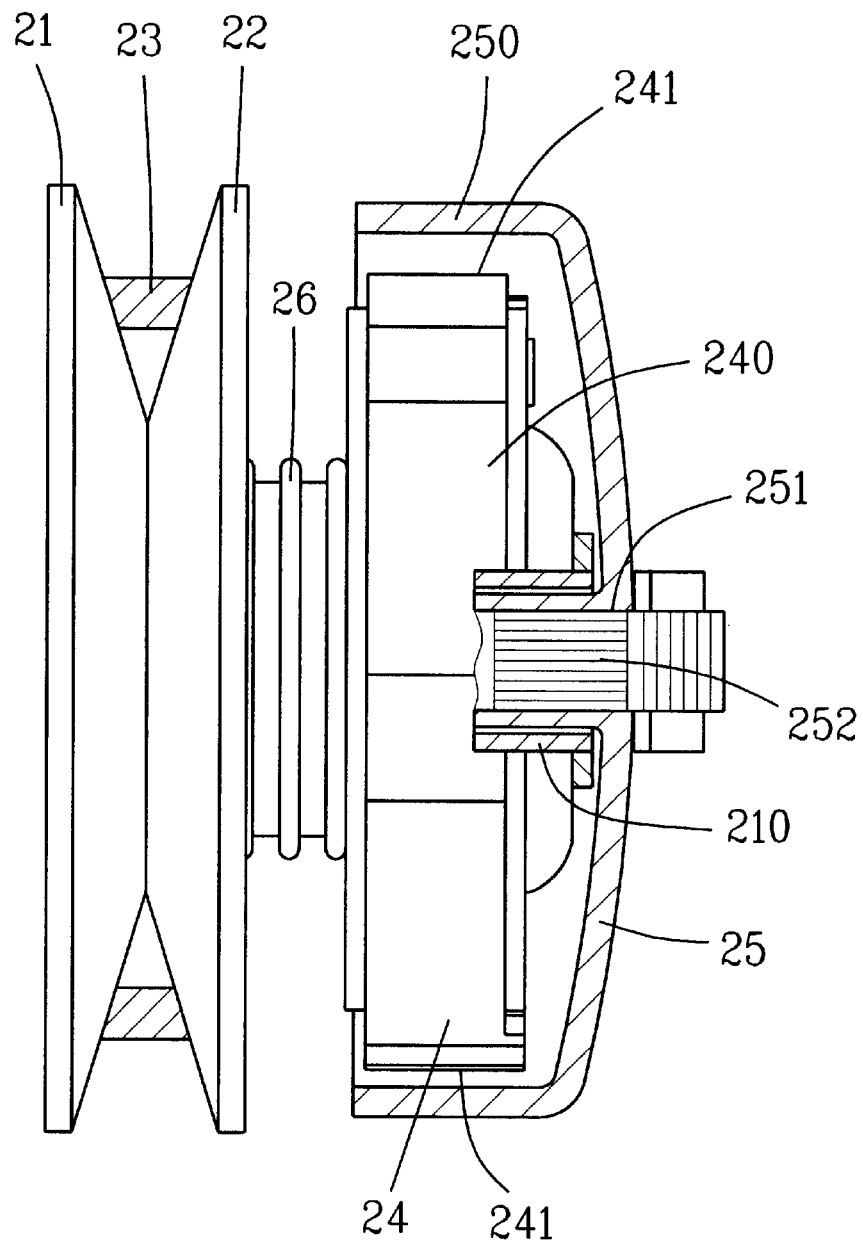
FIG. 3 is a cross-sectional view of the clutch of the conventional beach buggy.
Figure 4:
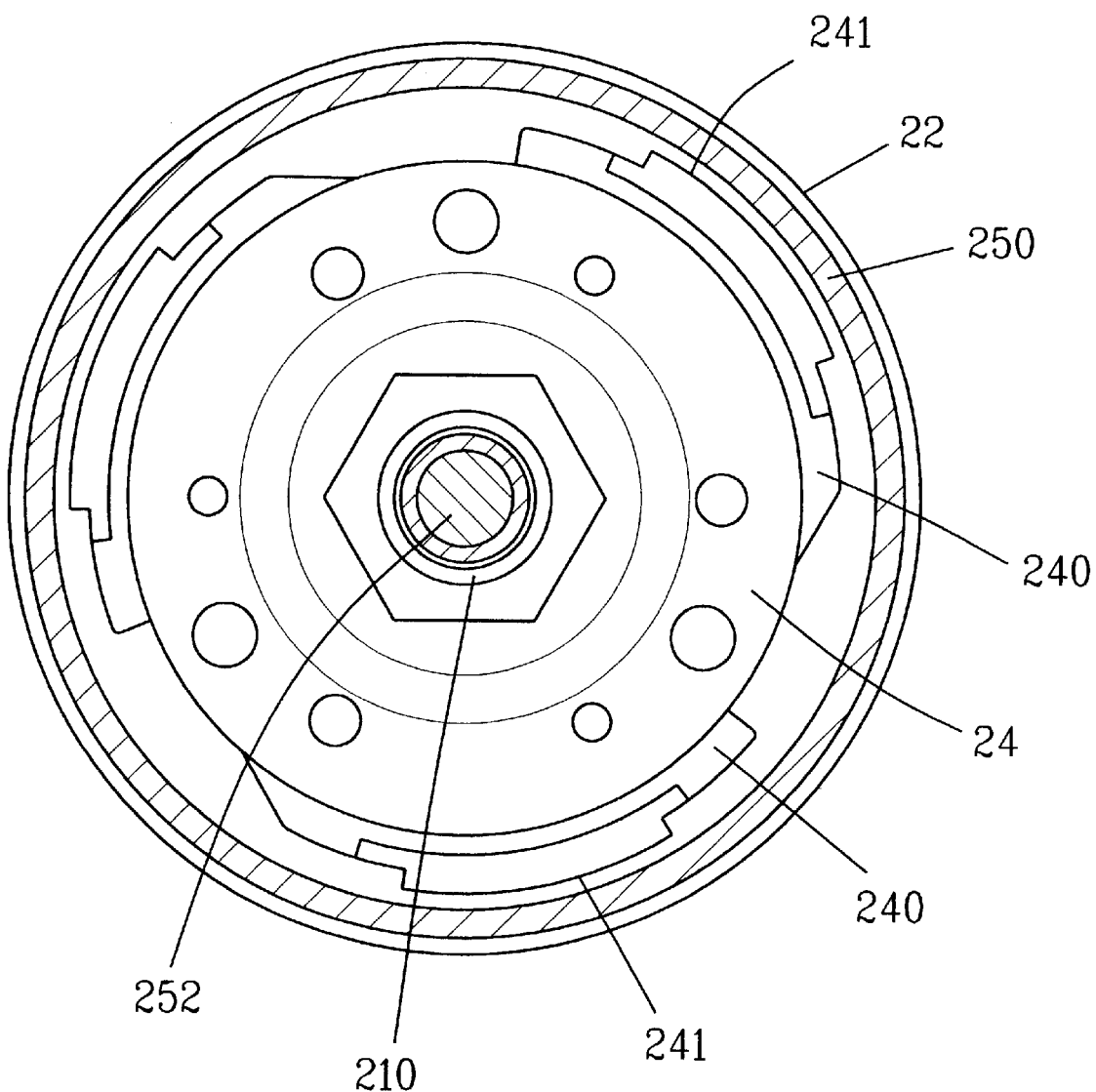
FIG. 4 is a side cross-sectional view of the clutch of the conventional beach buggy.
Figure 5:
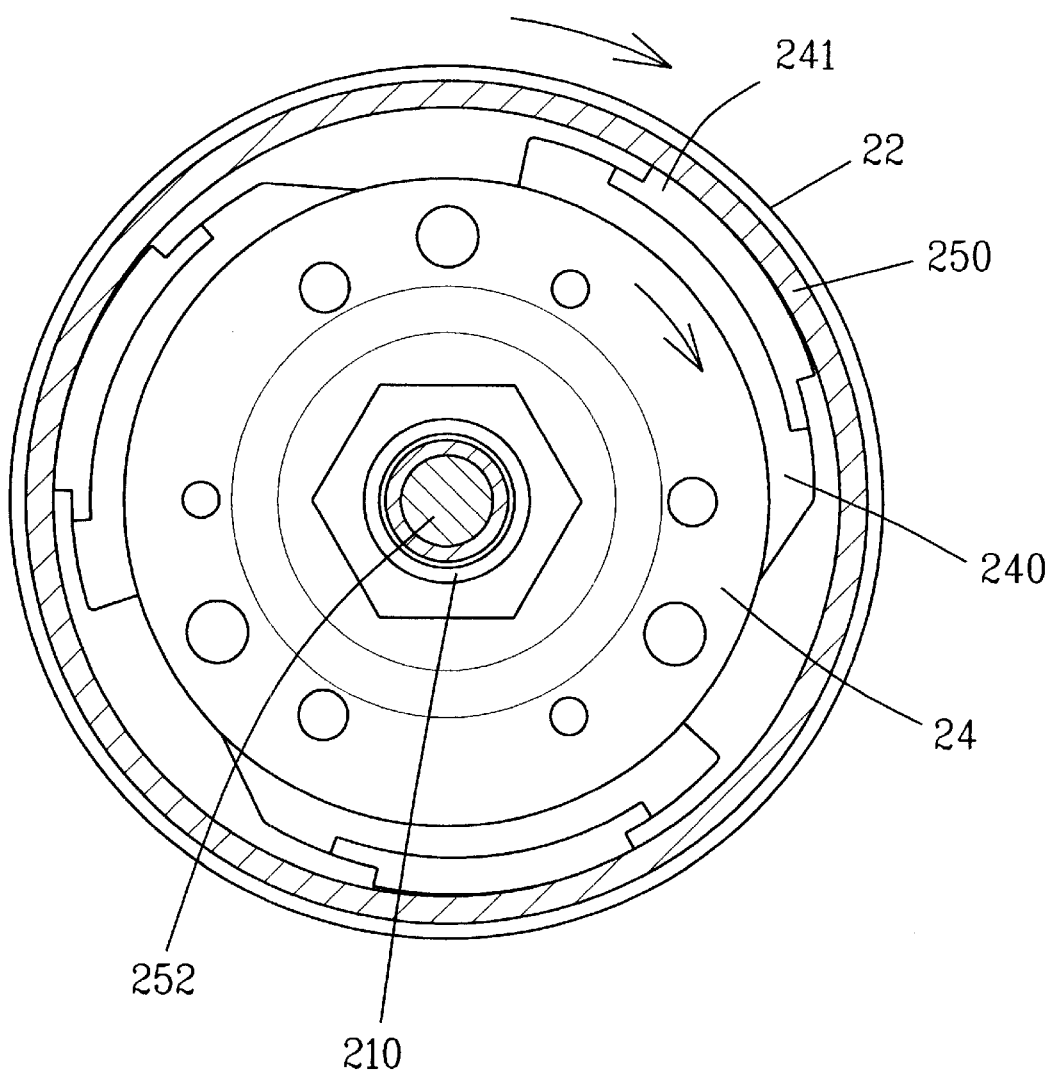
FIG. 5 is a side cross-sectional view of the clutch of the conventional beach buggy, showing it in an operating condition.
Figure 6:
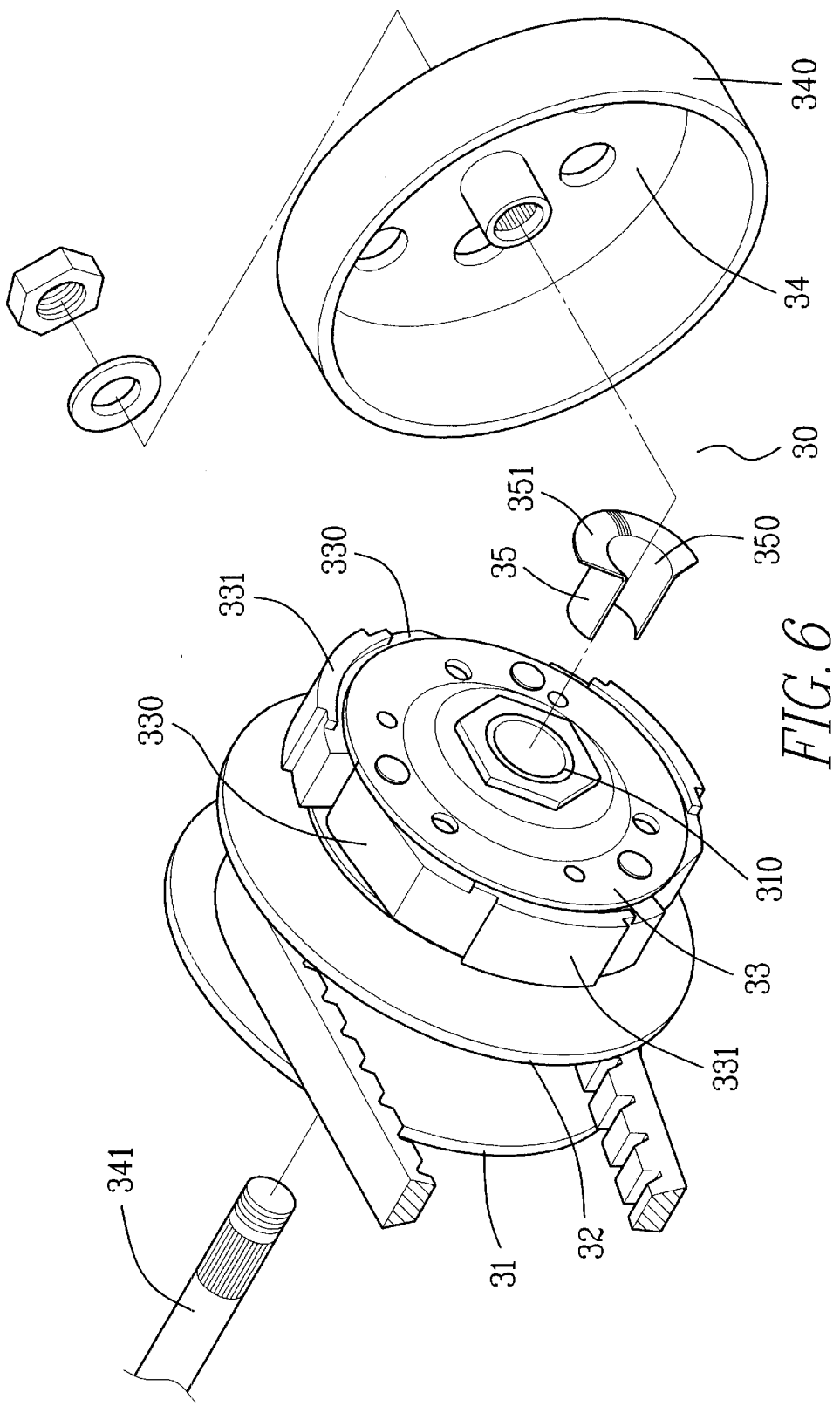
FIG. 6 is an exploded perspective view of a clutch of a beach buggy in the present invention.

A preferred embodiment of the clutch of a beach buggy, as shown in FIG. 6, includes a fixed groove wheel 31, a sliding groove wheel 32, an actuating member 33, an outer cover 34 and a resilient annular member 35 as main components combined together.

Figure 7:
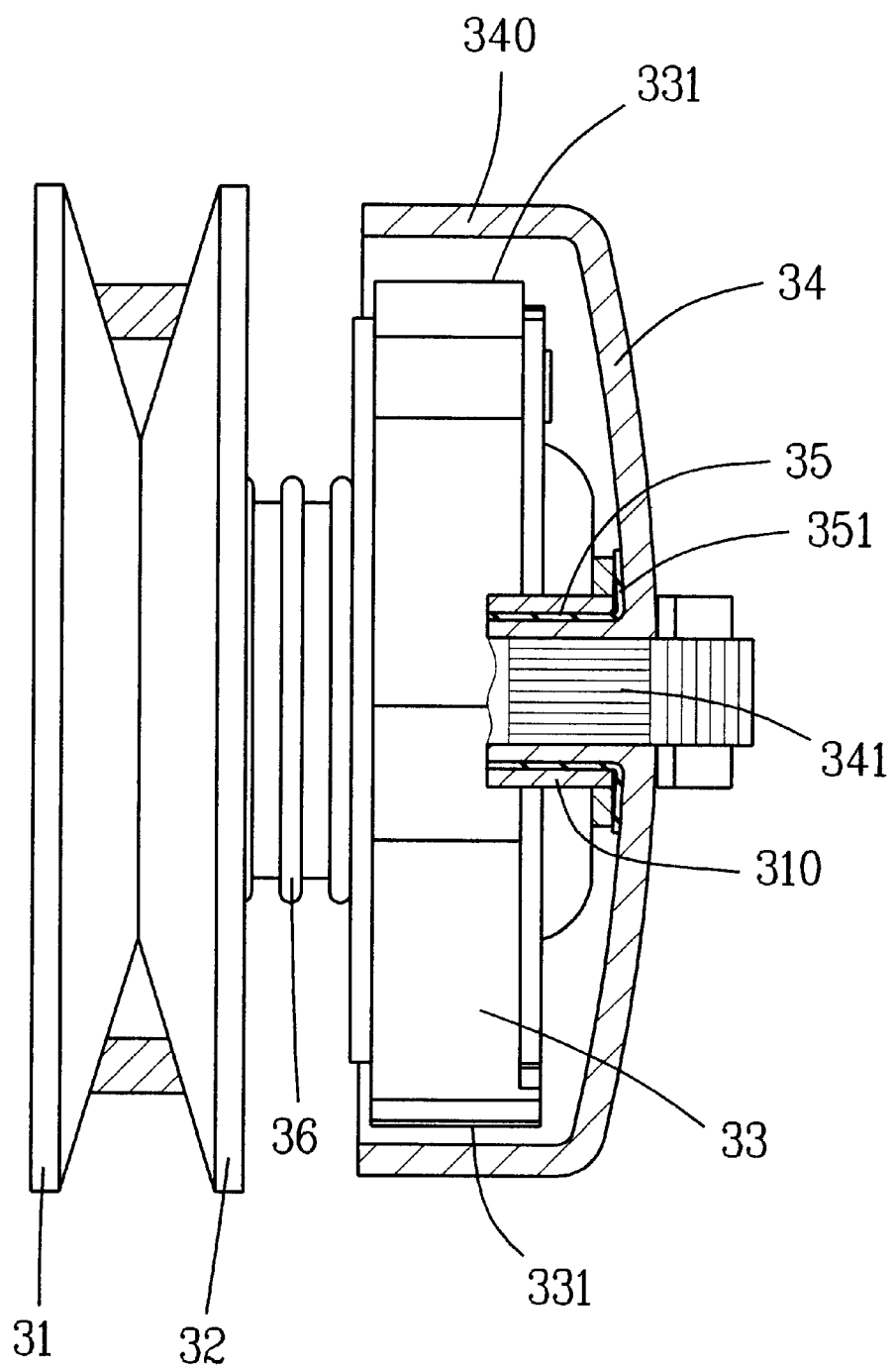
FIG. 7 is a cross-sectional view of the clutch of a beach buggy in the present invention.

The fixed groove wheel 31 has a protruding-out hollow shaft 310 secured in the center of one side, as shown in FIG. 7. The sliding groove wheel 32 is fitted around the hollow shaft 310 and pushed to press closely the fixed groove wheel 31 by a spring 36 so that a belt can be fitted between two wheels 31, 32 and push them to rotate to allow the clutch 30 rotate together with a drive disk.

Figure 8:
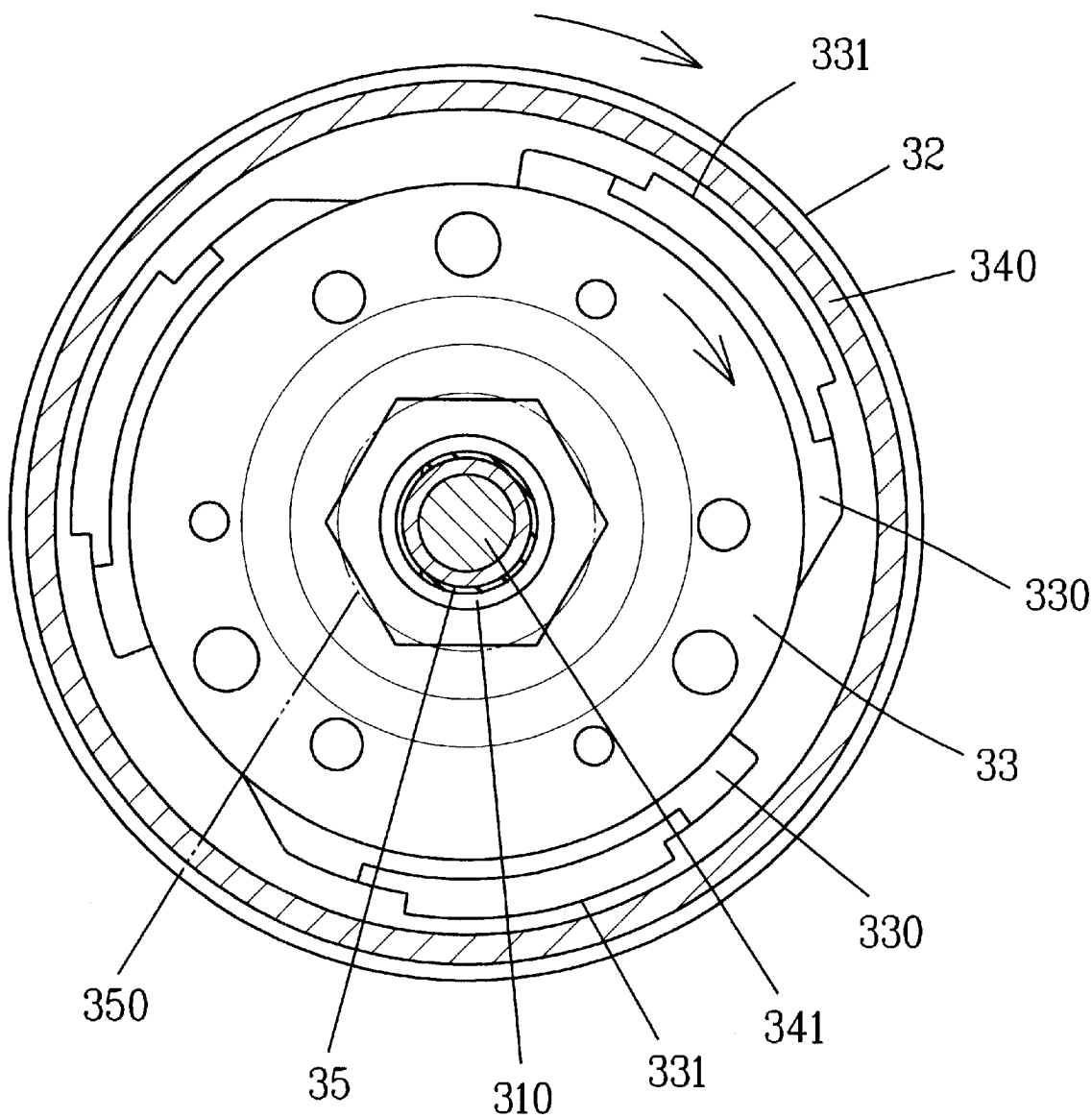
FIG. 8 is a side cross-sectional view of the clutch of a beach buggy in the present invention.

The actuating member 33 is fixed around the hollow shaft 310 and has a plurality of curved members 330 provided orderly on the outer rim. Each curved member 330 has one end pivotally connected with the actuating member 33 and the other end being a free, fixedly provided with a lining 331 on outer side, as shown in FIGS. 6 and 8.

The outer cover 34 is positioned outside the actuating member 33 and the hollow shaft 310, formed with an inward flange 340 for covering around the actuating member 33 and provided on a center portion with a drive shaft 341 connected to a transmission gear for rotating together.

Figure 9:
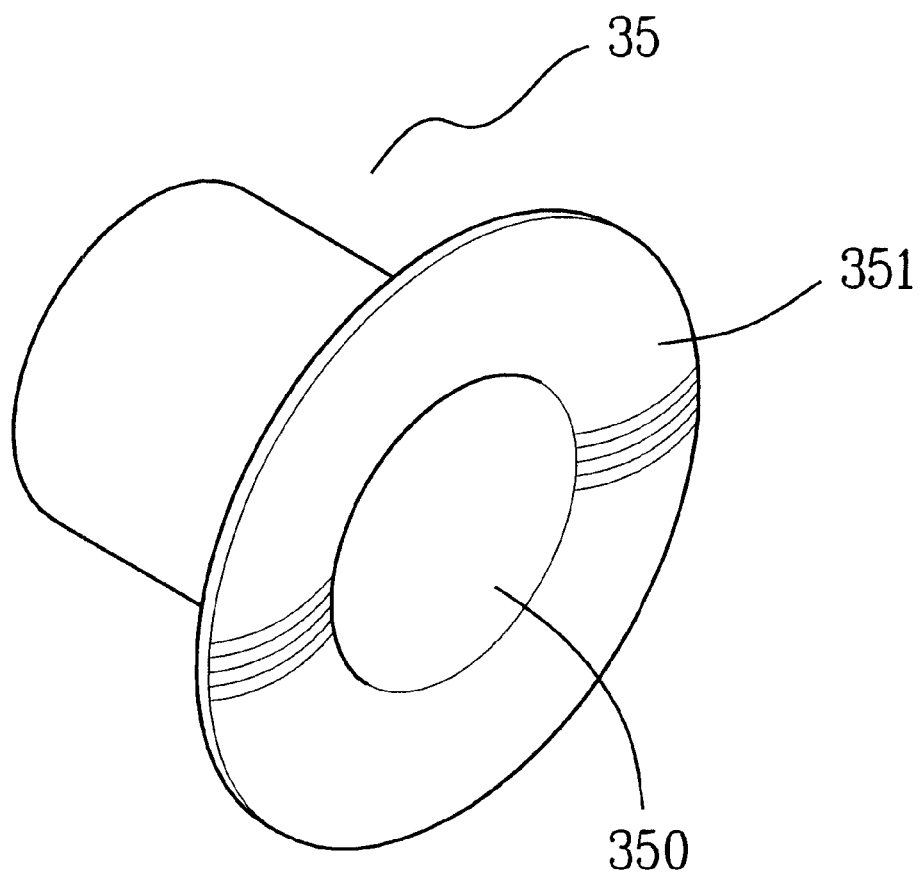
FIG. 9 is a perspective view of a resilient annular member of another type in the present invention; and, FIG. 10 is a side cross-sectional view of the clutch of a beach buggy in the present invention, showing it in an operating condition.

The resilient annular member 35 is made of a friction-enduring material, shaped either in a round tube, as shown in FIG. 9, or in a round tube with a crack as shown in FIG. 6, and having a center through hole 350 as well as an annular lip 351 protruding outward. The resilient annular member 35 is inserted in the front end of the hollow shaft 310, with its lip 351 positioned on the outer side of the hollow shaft 310 and the actuating member 33. Thus, the outer cover 34, after fixed in place, can closely contact with the end of the hollow shaft 310 as well as the side wall of the actuating member 33 by means of the lip 351, as shown in FIG. 7, and rotate slowly as soon as the engine is started, with its rotating speed slower than that of the actuating member 33.

Figure 10:
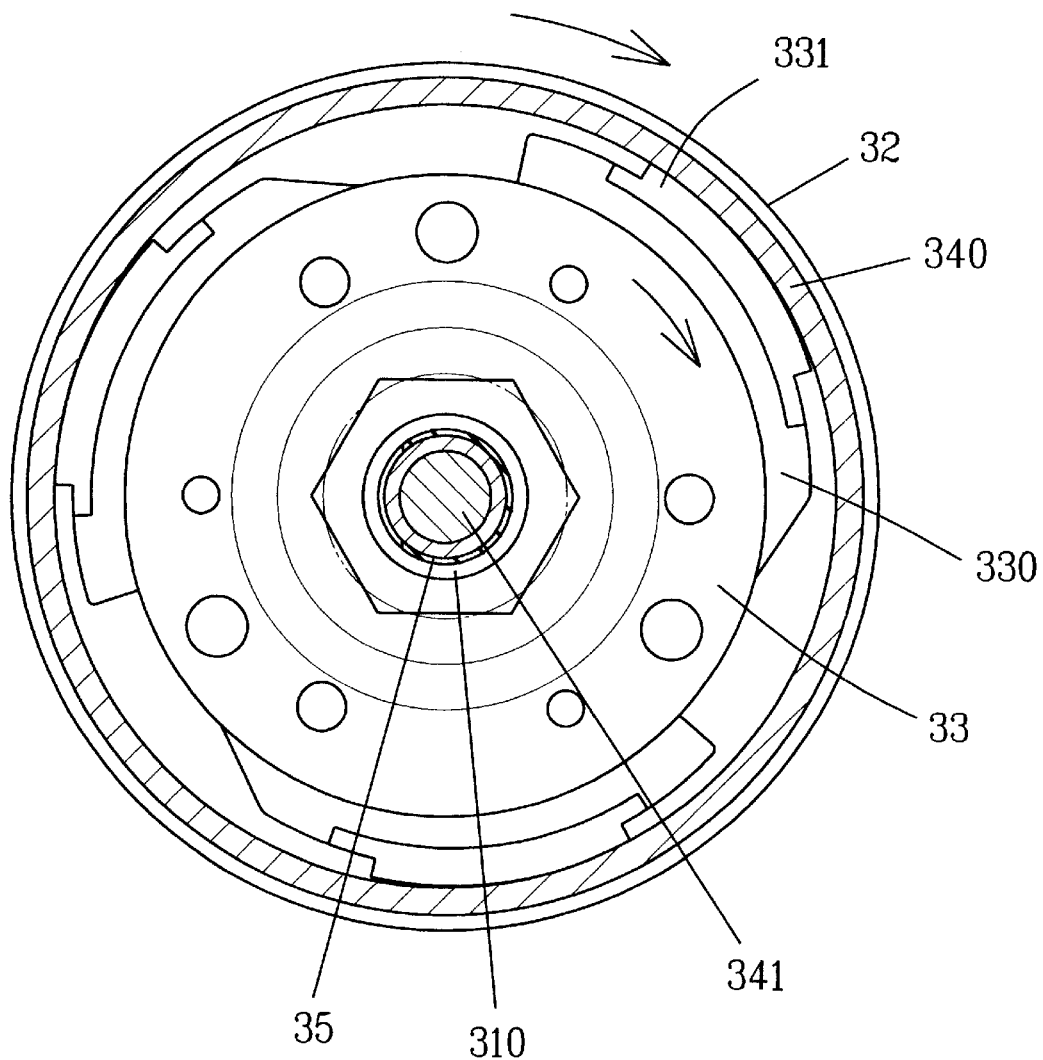

In using, when the engine is started, the drive disk, the belt and the clutch 30 will be driven to rotate synchronously, but at this time, the actuating member 33, through rotating, still has not a twisting force large enough to allow the curved members 330 to rotate the outer cover 34 because of not accelerated yet. But, as the outer cover 34 closely contacts with the hollow shaft 310 as well as the actuating member 33 by means of the resilient annular member 35, the outer cover 34 will be activated to rotate together with the transmission gear slowly, as shown in FIG. 8. Thus, when gear shifting begins, the shifting gear and one of the transmission gears, which are rotating at the same time, can mesh with each other easily and quickly. In other words, when the engine of a beach buggy is started, these two gears will immediately mesh with each other and after accelerated, the outer cover 34 will be activated to rotate with quickness, as shown in FIG. 10. Further, when the car is running forward, the actuating member 33 will rotate faster and faster and the curved members 330 of the actuating member 33 will expand outward due to centrifugal force, thus, preventing the beach buggy from rushing abruptly as caused in a conventional transmission device described above.

While the preferred embodiment of the invention has been described above, it will be recognized and understood that various modifications may be made therein and the appended claims are intended to cover all such modifications that may fall within the spirit and scope of the invention.

We claim:

1. A clutch of a beach buggy comprising:

a fixed groove wheel having a protruding-out hollow shaft fixed in the center of one side, said hollow shaft fitted around with a sliding groove wheel pushed to closely press said fixed groove wheel by a spring to let a belt fitted between two said fixed groove wheel and said sliding groove wheel, said belt connected to and driven by a drive disk to activate said fixed groove wheel and said sliding groove wheel to rotate, an actuating member provided adjacent to said sliding groove wheel and rotating together with said hollow shaft, said actuating member provided with a plurality of curved members on an outer rim thereof, each of said curved members having one end pivotally connected with said actuating member and another end being free, a lining fixed on each of said curved members, an outer cover positioned outside said actuating member, having an inward flange configured around an outer side of said curved members, said curved members expanding outwardly by centrifugal force produced by quick rotation of said actuating member so as to permit said lining to contact with said inward flange of said outer cover and rotate together, said outer cover provided with a drive shaft adapted to be connected to and rotated with a transmission gear, such that a transmission gear meshes with a shifting gear to rotate wheels of a beach buggy when a gear is shifted; and a friction-enduring resilient annular member inserted in said hollow shaft and closely positioned between said outer cover and said actuating member as well as the end of said hollow shaft to let said outer cover become activated to rotate slowly by said actuating member and said hollow shaft, said outer cover adapted to rotate slowly together with a transmission gear when an engine of a beach buggy is started.

2. The clutch of a beach buggy as claimed in claim 1, wherein said resilient annular member of a tube shape is inserted in said hollow shaft and said resilient annular member comprises an outward protruding annular lip positioned outside said hollow shaft and closely sandwiched between said actuating member and said outer cover.

3. The clutch of a beach buggy as claimed in claim 1, wherein said resilient annular member has a crack.

* * * * *